United States Patent [19]

Oliver

[11] 3,917,89[?]

[45] Nov. 4, 197[?]

[54] PLATE FOR ADJUSTABLY MOUNTING ELECTRICAL RECEPTACLE

[76] Inventor: Michael J. Oliver, 19741 NW. 7th Court, Miami, Fla. 33169

[22] Filed: Oct. 12, 1973

[21] Appl. No.: 406,023

Related U.S. Application Data

[62] Division of Ser. No. 277,859, Aug. 4, 1972, abandoned, which is a division of Ser. No. 88,863, Nov. 12, 1970, Pat. No. 3,697,924.

[52] U.S. Cl. .................... 174/57; 220/3.7; 248/27; 339/122 R
[51] Int. Cl.² ........................................ H02G 3/12
[58] Field of Search ..................... 174/53, 57, 66; 220/3.2–3.8, 3.92, 3.94; 339/122 R, 133 R, 123, 125 R, 126 R; 248/27

[56] References Cited
UNITED STATES PATENTS

| | | | |
|---|---|---|---|
| 690,479 | 1/1902 | Storm | 174/53 |
| 1,481,117 | 1/1924 | Ball | 220/3.4 |
| 1,490,252 | 4/1924 | Bissell | 220/3.6 |
| 1,672,683 | 6/1928 | Knoderer | 220/3.7 |
| 1,839,250 | 1/1932 | Newman et al. | 174/57 U |
| 1,930,610 | 10/1933 | Despard | 174/66 |
| 2,167,419 | 7/1939 | Heanes | 220/3.8 |
| 2,320,621 | 6/1943 | Lefebre | 220/3.8 |
| 2,532,599 | 12/1950 | Bourquin | 248/27 |
| 2,707,221 | 4/1955 | Frank | 174/57 U |
| 2,717,715 | 9/1955 | Whelan | 220/3.9 |

*Primary Examiner*—J. V. Truhe
*Assistant Examiner*—David A. Tone
*Attorney, Agent, or Firm*—Stevens, Davis, Miller & Mosher

[57] ABSTRACT

A grounding type electrical receptacle which utilizes positive clamping arrangement between the strap o[f] the receptacle and the grounded metal box to which [it] is attached by means of a screw-tightened groundin[g] wedge. The box opening in which the receptacle fi[ts] has arcuate ends with no protruding ears so that th[e] receptacle can be adjusted to proper vertical or hor[i]zontal alignment.

1 Claim, 8 Drawing Figures

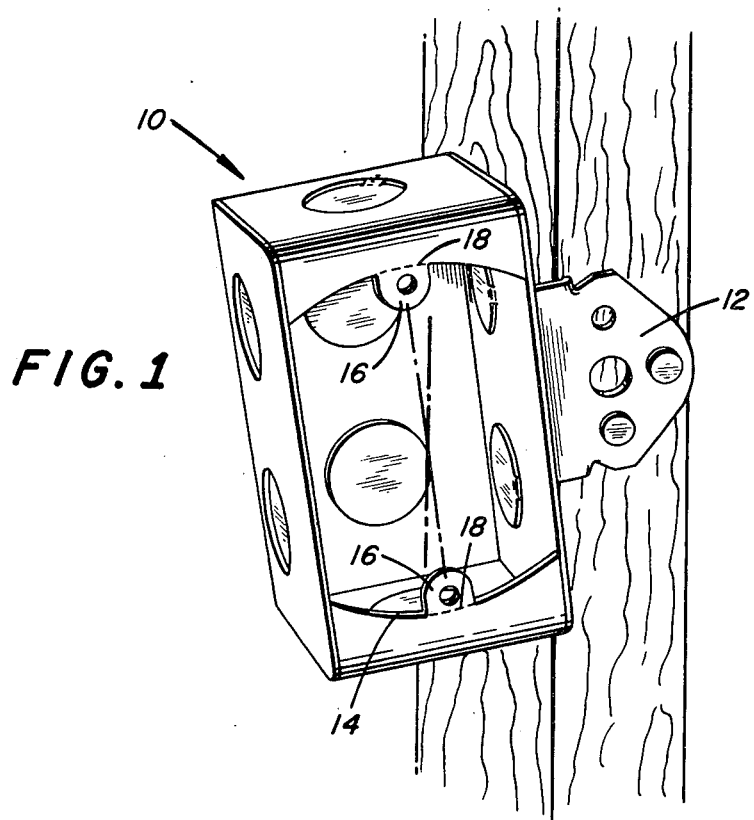
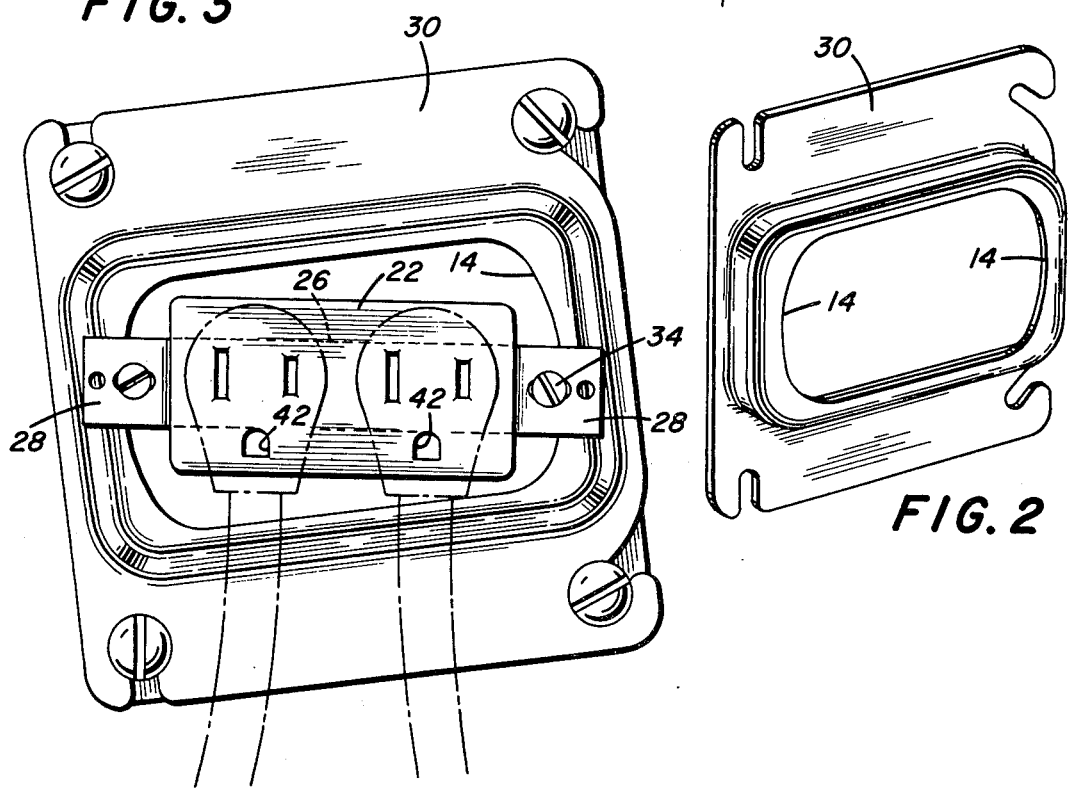

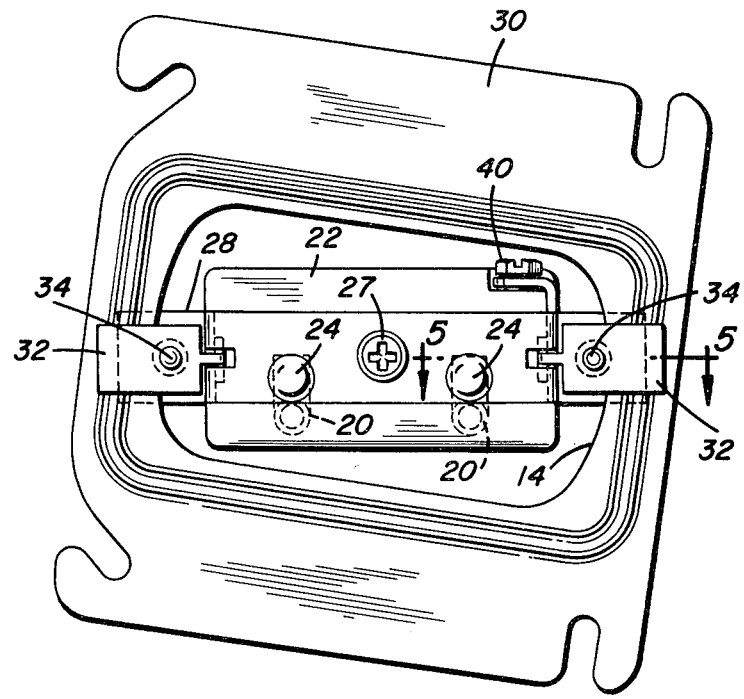
FIG. 4
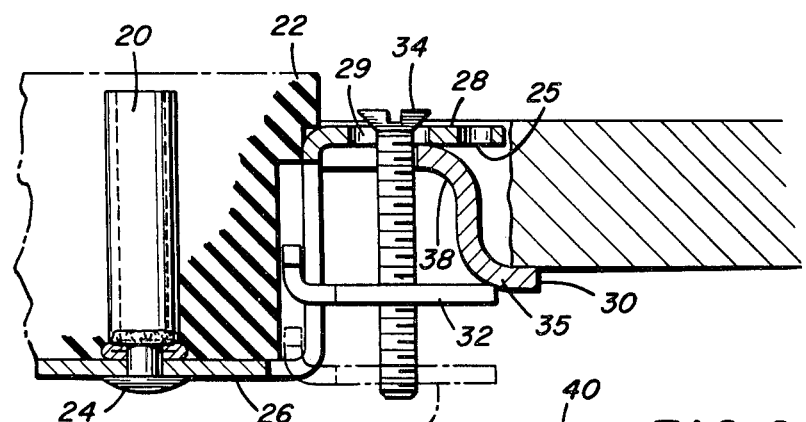
FIG. 5
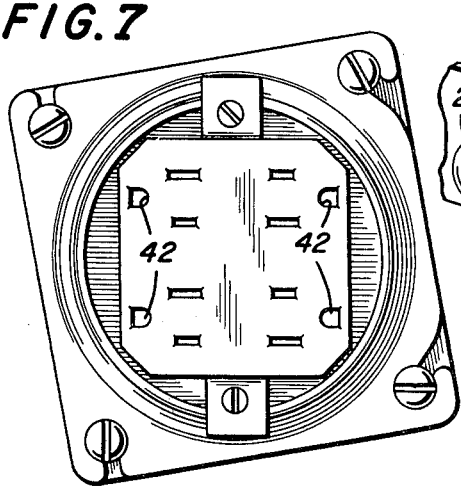
FIG. 7
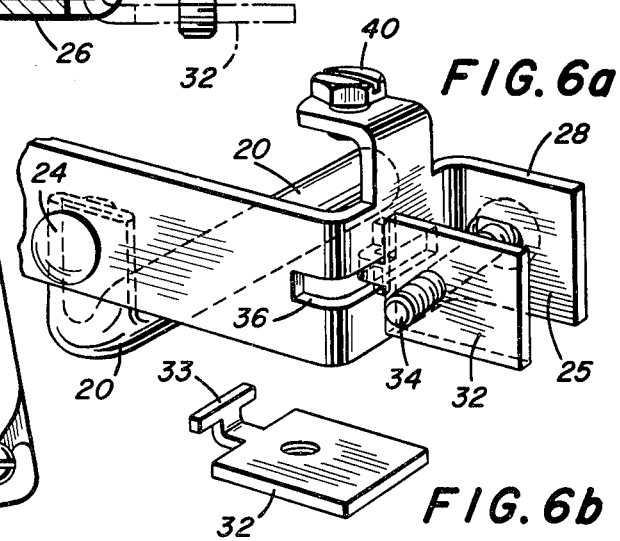
FIG. 6a
FIG. 6b

PLATE FOR ADJUSTABLY MOUNTING ELECTRICAL RECEPTACLE

This application is a division of application Ser. No. 277,859 filed Aug. 4, 1972 and now abandoned, that application in turn being a division of application Ser. No. 88863 of Nov. 12, 1970, now U.S. Pat. No. 3,697,924.

This invention relates to electrical wiring devices and more particularly to devices which have two current carrying conductors and a third grounding conductor which is not normally current carrying. Such grounding is required in many installations today and the conventional provision is a pair of parallel blades in an attachment cap which connects the current carrying conductors to a receptacle, and a third blade, U-shaped in cross-section, to similarly connect a grounding conductor. The grounding conductor is connected to the external frame of the appliance or motor being supplied by the cord and connections within the receptacle device carry a separate grounding conductor back to the service entrance equipment where a separate connection is made to a positive ground such as a water pipe or rod driven in the earth. Such a grounding system provides positive protection against shock hazards in an electrical system where the neutral conductor is at earth potential.

However, in the installation of such grounding type devices, particularly duplex wall receptacles, considerable delays and difficulties are experienced due to the type of equipment presently available. A square or rectangular metal box is usually placed in or on a wall for housing the electrical receptacle and that outlet is fed by a pipe or cable which connects to a knockout in the box. A separate grounding conductor is usually brought into the box along with the current carrying conductors and it must be connected not only to the frame of the box, but also to the receptacle itself. Thus, two separate connections are needed for the grounding wire but only one connection is needed for the current carrying wires. Usually the terminals of the receptacle which receive the U-shaped grounding blade are attached to a metal strap which is an integral part of the receptacle. This strap is brought out on each end of the receptacle and provided with holes through which screws are inserted in order to attach the receptacle to the outlet box which has previously been positioned within or on the surface of the wall. To keep the screws in place during shipping and handling (prior to installation) the screws are usually held in place by small pieces of fiberboard which are slid over the screws after they are inserted in their holes. When the receptacle is attached to the outlet box, these pieces of fiberboard are usually left in place and, unfortunately, provide an insulation rather than a conducting path between the grounded outlet box and the strap of the receptacle to which the grounding blades are in contact. Thus, it is necessary to provide a separate grounding means, usually a machine screw tapped into the receptacle strap itself, so that the grounding conductor can be brought out of the outlet box and separately secured to the strap of the receptacle.

A further problem is entailed in conventional electrical equipment when an outlet box is positioned in or on a wall at any marked degree away from desired vertical or horizontal alignment. Most electrical devices such as switches or receptacles have a slotted hole for adjusting the horizontal or vertical alignment of the device bu this slot only allows for perhaps a ten percent variatio in alignment. Thus, great care must be taken in roug installation work to be certain that outlet boxes are ap proximately vertical (or horizontal) in order to avoid crooked installation when the receptacles or switche are installed after the finished wall surface has been ap plied.

A further difficulty in prior art electrical receptacle is the fact that many attachment caps especially thos on large appliance cords are made so that the blade extend at a right angle to the cord itself. This is, c course, advantageous in keeping the cord flat agains the wall adjacent the receptacle but, due to the posi tioning of the grounding slot in most receptacles, it i impossible to run two right angled attachment cap from the same duplex receptacle since the cord of on cap will overlap the openings designed for the othe cap.

It is an object of this invention to provide an electri receptacle which can be positively grounded to its out let box by clamping means which engage the edge c the box or cover thereon.

Another object is to provide a grounding means fo an electrical receptacle which is faster and easier to in stall yet provides firm support for the receptacle itsel Another object of this invention is to provide mean for vertically or horizontally mounting an electrical de vice in an outlet box which is not secured in such align ment.

A further object of this invention is to provide a electrical receptacle which has the slots for the U shaped grounding blade so positioned that more tha one right angle attachment cap can be plugged into duplex or quadruple receptacle.

It should be understood that this invention contem plates a new system of electrical devices, particularl receptacles, which when all the components are use together, will provide a much faster, easier and mor positive grounding facility but at the same time is en tirely compatible with existing standards so that one c more of the elements of the new system can be use with conventional equipment or all of the elements ca be used together.

Other objects and advantages will become apparen from the attached drawings which are designed to illus trate, by way of example and not limitation, a preferre embodiment of the present invention, in which:

FIG. 1 shows an outlet box with detachable ear which has been mounted crooked and would normall present a problem in installing a vertical outlet;

FIG. 2 is a plaster ring cover plate having an arcuat opening without mounting ears designed for attach ment to a standard square outlet box;

FIG. 3 shows the plate of FIG. 2 mounted on an ou let box which is crookedly installed but the receptacl on it has been adjusted to be horizontal;

FIG. 4 is a rear view of the illustration of FIG. 3;

FIG. 5 is a view in section along line 5—5 of FIG. 4

FIGS. 6a and 6b show details of the mountin bracket of FIG. 5;

FIG. 7 shows a double duplex receptacle with th slots for the U-shaped grounding terminals positione to permit more ready attachment by right angle attacl ment caps.

Turning now to the drawings in greater detail, FIC 1 shows (a wall case, handy box) 10 secured to a wa ld by means of a mounting bracket 12. Instead of the nventional rectangular opening on the front of the x, the upper and lower edges of the opening have an :uate shape 14 and have ears 16 which are mounted means of perforations 18 so that they can be easily oken off to leave a smooth arcuate opening at each d. The advantages of the arcuate opening will be examined in connection with the mounting of the receptle.

Turning now to FIGS. 5 and 6, a broken away portion electrical outlet 22 of FIG. 4 is shown having a sleeve which acts as the contacting surface for a U-shaped ounding blade of an attachment cap inserted therein. iis sleeve 20 is secured by means of a rivet 24 to the ap 26 which forms the backbone of the receptacle d is secured thereto by a screw 27 (see FIG. 4). It ould be understood that the receptacle is conventional in the type of contacts for receiving the current rrying blades and insulation surrounding them and ose known parts have not been illustrated in detail. ie strap 26 is substantially U-shaped and runs the ene length of the back of the receptacle with an outardly projecting ear 28 on each end thereof as can be tter seen in FIGS. 3 and 4. The ear 28 has an oblong le 29 through which passes a screw 34 which is readed into grounding wedge 32 having a T shaped tension 33 which projects into a slot 36 in strap 26. ie outlet is inserted in the opening of the cover 30 so at the inside surface 25 of the ear 28 comes to rest ainst the outside raised surface of the cover 30. The rew 34 is then turned so as to draw the grounding edge 32 from the lower position shown in dotted lines FIG. 5 to its upper clamping position where it ntacts the underside of cover plate 30. In FIG. 5, the int of contact is at 35 but it should be understood at if the opening is slightly larger, the grounding edge 32 could be drawn all the way up so that it would ntact the underside of the cover plate at point 38 or termediate points also. The T shaped extension 33, of urse, remains in the slot 36 and guides the wedge 32 it is drawn upwardly by screw 34. Thus, a very firm id solid mechanical and electrical connection can be complished between the strap 26 of the receptacle id the cover 30 which is in turn mechanically and ectrically secured to the outlet box. This box, as preously described, has been electrically grounded to the ounding conductor of the cable feeding it. Hole 29 is ade oblong in a direction parallel with the length of ie strap (see FIG. 6a) so that the screw 34 and wedge 2 may be laterally displaced as the screw is tightened order to insure good contact between the wedge 32 id the cover 30.

If it is desired to mount the receptacle shown in IGS. 5 and 6 in a standard box which has a lip with a pped hole projecting from it rather than an arcuate id (such as in repair work), this can easily be accomlished by removing and discarding grounding wedge 2. It is then, of course, necessary to separately attach grounding wire in order to insure a positive connecon for the U-shaped grounding blade and thus a contentional grounding screw 40 is also provided.

As previously mentioned, the grounding receptacle f this invention is preferably used with a box or cover late which has an arcuate opening. In the box of FIG. , break-off ears were provided so that a standard reeptacle could be mounted therein, the arcuate front all of the box which is formed of bent over extensions of the top and bottom walls also giving additional strenth and rigidity. Preferably, as shown in FIG. 2, a cover plate or plaster ring for a conventional square outlet box is provided with an arcuate shape on its two short sides. Although FIG. 2 illustrates a plaster ring 30 with no ears projecting from the arcuate ends, it should be understood that as part of the system of this invention such a plate could also be manufactured in order to make it easier to use standard receptacles interchangeably with those of the present invention. If it were contemplated to use the present grounding system throughout a new construction job, then plates similar to those of FIG. 2 would be used throughout; for repairs or use by small contractors, plates with breakaway tapped ears would probably be used.

In FIG. 7, a two gang duplex receptacle in a single housing is shown mounted in a plate somewhat similar to that illustrated in FIG. 2 except that the opening is round rather than oblong, thus, such an opening has a continuous arcuate edge. A single gang receptacle could also be mounted in a circular opening provided the outside trim of the plate or cover (which would be attached after all connections were complete) were large enough to cover the opening. With such a round opening, of course, 360° of adjustment is possible thus enabling the installer to decide at the last moment whether a particular outlet should be positioned vertically or horizontally.

In another aspect of this invention, the slots 42 to receive the U-shaped grounding terminal are located to the outside of the current carrying slots. This can be accomplished as shown in FIG. 3 for a single gang receptacle or as shown in FIG. 7 for a two gang receptacle. In both cases, the grounding slots 42 are positioned in the same relationship to the current carrying slots as in standard receptacles (so as to accept a standard grounding attachment cap) but the three slots are turned 90° in the receptacle so that the current carrying slots run perpendicular to, rather than parallel to, the strap of the receptacle. The benefit of such an arrangement is clearly shown by the fact that two right angle attachment caps are inserted in the receptacle (in phantom lines) in FIG. 3. Similarly, four right angle caps could be run from the outlet shown in FIG. 7.

It should be understood that this invention is not limited by the foregoing description which is by way of example only but as defined in the following claims.

I claim:

1. A device for supporting an electrical receptacle having means for clampingly engaging an interior edge of an opening so as to electrically connect said clamping means to said interior edge, said device comprising:
   a. a plate having a substantially flat rear surface with outer edges having means to secure the plate to an electrical outlet box;
   b. a central raised portion on the front of the plate projecting outwardly therefrom with inwardly turned edges to define a second substantially flat surface generally parallel to the rear surface;
   c. a generally rectangular shaped opening in said second flat surface having two substantially parallel long sides and two non-parallel short sides, the short sides being arcuately curved away from the center of the opening along their entire lengths to present said second flat surface in that area with an arcuately curved interior edge for engagement by said clamping means.

* * * * *